United States Patent
Schwaiger

[15] 3,695,631
[45] Oct. 3, 1972

[54] ANTI-THEFT DEVICE FOR TRAILER
[72] Inventor: John E. Schwaiger, 7556 Raleigh-la Grange Road, Cordova, Tenn. 38108
[22] Filed: Nov. 3, 1970
[21] Appl. No.: 86,505

[52] U.S. Cl..............................280/507, 280/150.5
[51] Int. Cl. .............................................B60d 7/00
[58] Field of Search.......280/475, 150.5, 150 R, 507; 214/501, 505; 254/86, 86 H

[56] References Cited

UNITED STATES PATENTS

| 3,321,181 | 5/1967 | Wagner | 280/150.5 |
| 3,529,850 | 9/1970 | Montalto | 280/150.5 |
| 3,348,860 | 10/1967 | Buckles | 280/475 |
| 3,024,930 | 3/1962 | Sims | 214/501 |
| 1,506,165 | 8/1924 | Doyle | 254/86 R |

Primary Examiner—Benjamin Hersh
Assistant Examiner—Robert R. Song
Attorney—John R. Walker, III

[57] ABSTRACT

A device for attachment to a trailer comprising a U-shaped member having a flange mounted between the sides thereof to which a support member may be locked to maintain the support member in a position perpendicular to the tongue of the trailer and whereby the tongue of the trailer is maintained at an angle oblique to the surface upon which the trailer is resting. The support member may also be locked to the flange in a storage position.

8 Claims, 5 Drawing Figures

PATENTED OCT 3 1972

3,695,631

INVENTOR.
JOHN E. SCHWAIGER

BY John R. Walker, III
Attorney

ANTI-THEFT DEVICE FOR TRAILER

BACKGROUND OF THE INVENTION

1. Field of the Invention

This invention relates to anti-theft devices for trailers, such as boat trailers, camping trailers and the like.

2. Description of the Prior Art

A need has long existed for a simple, inexpensive device which might be attached to a boat trailer to prevent its theft when the trailer is not locked to a car, post or a similar seemingly substantial item. It is quite often necessary to leave one's trailer parked where there is nothing to which the trailer may be locked.

Various devices have been invented in an effort to prevent the theft of a trailer. U.S. Pat. Nos. 3,226,133 to Geresy, 3,237,969 to Geresy, and 3,434,741 to Grant are indicative of the various efforts expended in this area. None of these patents fully satisfy the need since any of the trailers equipped with the devices disclosed therein may be easily tied or otherwise secured to the rear of a motor vehicle and towed away. U.S. Pat. No. 1,506,165 to Doyle discloses a device which, by way of a jack, maintains the wheels of a trailer out of contact with the road to thereby prevent theft of the trailer.

SUMMARY OF THE INVENTION

It is an object of this invention to provide an anti-theft device which may be easily attached to any trailer and which may easily and quickly be positioned from a storage position to a use position to maintain the tongue of a trailer oblique to the surface supporting the trailer to thereby prevent movement of the trailer.

A U-shaped member is bolted or welded to either the frontward or rearward portion of a trailer and is adapted to receive an L-shaped support member. The U-shaped member has a flange therein having an opening therethru which may be brought into alignment with an opening thru the tongue or shorter portion of the L-shaped support member. An ordinary lock may be used to secure the support member to the flange. The support member rests against the ground and maintains the tongue of the trailer oblique to the ground in such a position that the trailer hitch is disposed at a level spaced vertically from the level of the hitch mechanism on the towing vehicle so that towing of the trailer by the vehicle is virtually impossible with the support member in this position.

DESCRIPTION OF THE PREFERRED EMBODIMENTS

Figure 1:
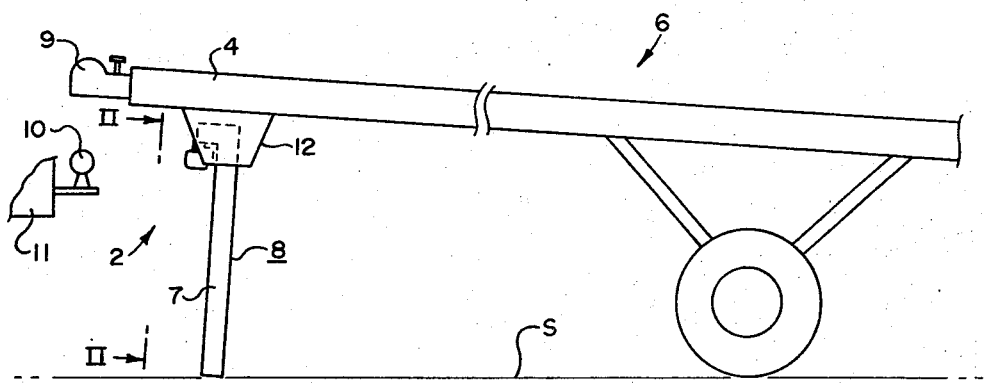
FIG. 1 is a side elevation of a trailer showing the anti-theft device attached near the front thereof.
Figure 5:
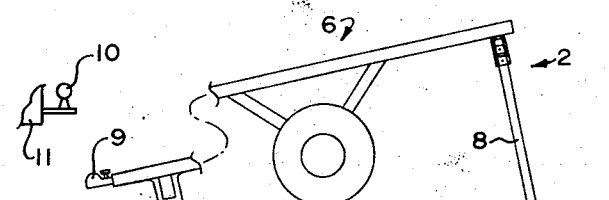
FIG. 5 is a side elevation of a trailer showing the anti-theft device attached near the rear thereof.

Referring to FIG. 1, anti-theft device 2 is shown connected to tongue 4 near the front of a trailer 6. The length of the first or longer segment 7 of L-shaped support member 8 is chosen to maintain the tongue of the trailer at an angle oblique to surface S, when support member 8 is in the "use" position to thereby make movement of the trailer virtually impossible. Stated another way, the length of segment 7 of support member 8 is such that the trailer hitch 9 is disposed at a level or height spaced above the level of the trailer ball 10 attached to a towing vehicle 11 so that the hitch 9 cannot be lowered to engage the ball 10 for towing. I will be understood that the hitch 9 and ball 10 are of any suitable construction, such as the usual ball and socket type of trailer hitch well known to those skilled in the art. Anti-theft 2 may be connected to a trailer near the rear thereof as is disclosed in FIG. 5, in which case the trailer hitch 9 is disposed at a level or height spaced below the level of the trailer ball 10 so that any attempt to raise hitch 9 to engage ball 10 for towing would be prevented by support member 8.

Figure 2:
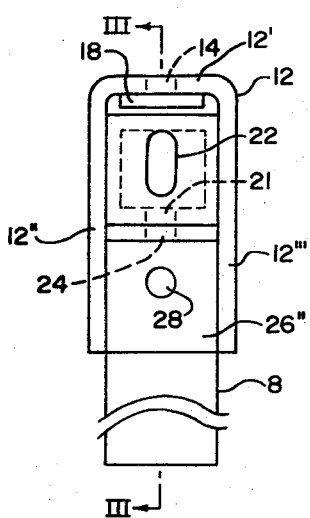
FIG. 2 is a view of the anti-theft device with the lock removed, taken along line II—II OF FIG. 1.

Device 2 includes an inverted U-shaped member 12 which may be attached to the trailer by any conventional means. U-shaped member 12 includes an upper side 12', and a pair of laterally spaced sides 12'' and 12''', integrally attached to upper side 12' and depending therefrom. The U-shaped member 12 may be bolted to the trailer 6 via openings 14 and 16 shown in FIGS. 2 and 3. A spacer 18 is provided when the present invention is to be bolted to the trailer to thus prevent the tongue portion 19 of support member 8 from being obstructed by the head of a bolt that may be inserted through hole 14 or 16. It is obvious, of course, that openings 14 and 16 and spacer 18 may be omitted if one should desire to weld U-shaped member 12 to trailer tongue 4.

Figure 3:
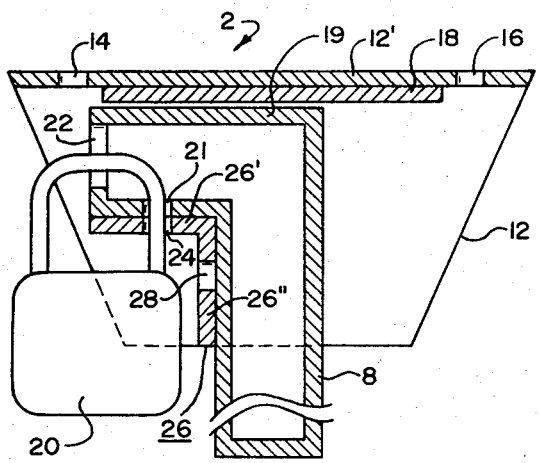
FIG. 3 is a cross-sectional view taken along line III—III of FIG. 2.

FIG. 3 discloses support member 8 in the "use" position. A lock 20 may be inserted through openings 21 and 22 in the tongue portion 19 of support member 8 and opening 24 of a flange member 26 to permanently place the anti-theft device in use. Flange member 26 is fixedly disposed within U-shaped member 12 and includes a first portion 26', which is in parallel spaced relationship to upper side 12' and in which is provided opening 24. In addition, flange member 26 includes a second portion 26'' which is attached to portion 26' and depends perpendicularly therefrom.

Figure 4:
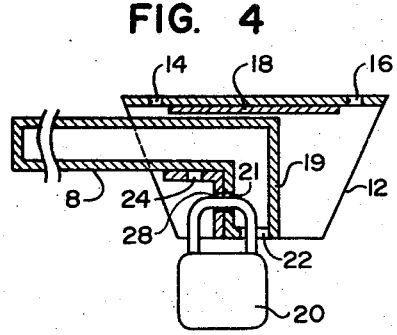
FIG. 4 is a cross-sectional view of the anti-theft device disclosing the support member in a storage position.

FIG. 4 discloses support member 8 in the "storage" position. To secure support member 8 in this position, support member 8 is inserted into U-shaped member 12 such that opening 21 and an opening 28 in portion 26'' are aligned. A lock may then be inserted through openings 21 and 22 in the tongue portion of support member 8 and opening 28 of flange portion 26''.

With the lock removed, the anti-theft device may be easily changed from the "use" position to the "storage" position. It will be understood that, if desired, support member 8 may be stored some place other than in the above described "storage position," as for example in the boat or in the vehicle.

The present invention is extremely simple, having no springs or pins and only two basic parts. The present invention is inexpensive and virtually free from maintenance since it may be made of steel.

Although the invention has been described and illustrated with respect to a preferred embodiment thereof, it is not to be so limited since changes and modifications may be made therein which are within the full intended scope of the invention.

I claim:

1. An anti-theft device for trailers that are engageable to tow vehicles comprising means for maintaining the tongue of said trailer at an angle oblique to the surface upon which said trailer is resting for preventing engagement of the tongue of said trailer to a tow vehicle, said means comprising a support member and lock means for lockably attaching said support member to said trailer.

2. An anti-theft device as set forth in claim 1 wherein said means for lockably attaching said support member to said trailer comprises an inverted U-shaped member adapted to be attached to said trailer, said U-shaped member having a first side, a second side and an upper side; said U-shaped member being adapted to receive said support member.

3. An anti-theft device for trailers comprising means for maintaining the tongue of said trailer at an angle oblique to the surface upon which said trailer is resting, said means comprising a support member and a means for securely attaching said support member to said trailer; said means for securely attaching said support member to said trailer comprising an inverted U-shaped member adapted to be attached to said trailer, said U-shaped member having a first side, a second side and an upper side; said U-shaped member being adapted to receive said support member; said means for securely attaching said support means to said trailer further comprising a flange member having a first portion and a second portion, said first portion being mounted between said first and second sides of said U-shaped member parallel to said upper side of said U-shaped member; said second portion of said flange member being mounted between said first and second sides of said U-shaped member perpendicular to said upper side of said U-shaped member; said first portion of said flange having an opening therethrough; said support member having an opening therethrough for alignment with said opening through said first portion of said flange member whereby a locking means may be inserted to secure said support member to said flange member.

4. An anti-theft device as set forth in claim 3 wherein said second portion of said flange member has an opening therethrough which may be aligned with said opening thru said support member whereby a locking means may be inserted therethrough to maintain said support member in a storage position wherein said support member is substantially parallel to the tongue of said trailer.

5. An anti-theft device as set forth in claim 4 wherein said support member comprises a first segment having a length substantially greater than the height of said trailer and a tongue member having at least a first side and an end, said tongue member being mounted perpendicular to said first segment and having a length substantially the same as said first and second portions of said flange member; said opening through said support member comprising an opening through said first side and said end of said tongue member.

6. An anti-theft device as set forth in claim 5 wherein said anti-theft device is mounted near the front of said trailer, said first segment of said support member having a predetermined length commensurate with the location of said anti-theft device to maintain the tongue of said trailer at an angle such that the rearward portion of said trailer is positioned near said surface to make movement of said trailer virtually impossible.

7. An anti-theft device as set forth in claim 5 wherein said anti-theft device is mounted near the rear of said trailer, said first segment of said support member having a predetermined length commensurate with the location of said anti-theft device to maintain the tongue of said trailer at an angle such that the frontward portion of said trailer is positioned near said surface to make movement of said trailer virtually impossible.

8. The combination with a trailer of the type comprising a frame including a tongue and trailer hitch means mounted on said tongue for engaging a complementary hitch mechanism mounted on a vehicle at a predetermined level for towing the trailer, of an anti-theft device comprising a support member and means including lock means securely attaching said support member to said frame in an "in use" position depending downwardly from said frame into engagement with the trailer's supporting surface to hold said trailer hitch means at a level spaced vertically from the level of said hitch mechanism with said tongue at an angle oblique to the surface upon which the trailer is resting so that said trailer hitch means is prevented from engaging said hitch mechanism for towing said trailer without unlocking said lock means and removing said support member from said "in use" position.

* * * * *